May 19, 1959     W. E. F. WATSON     2,887,169
SOIL-WORKING PLOUGH
Filed July 9, 1956     4 Sheets-Sheet 1
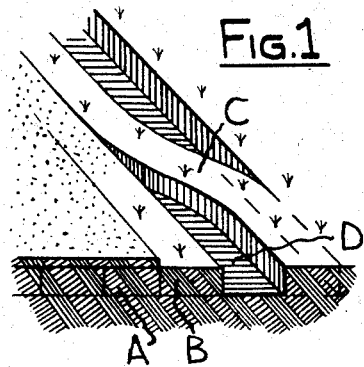
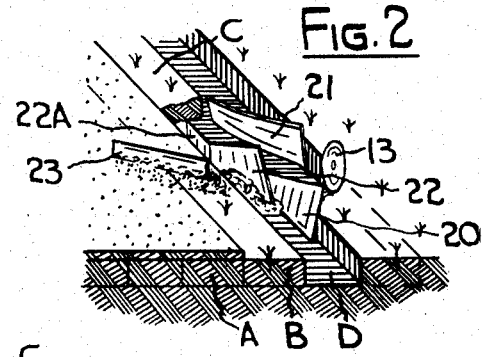
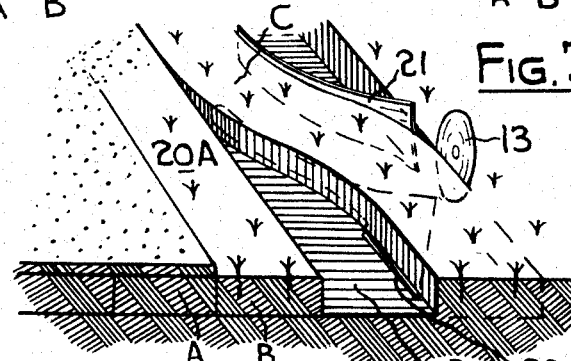
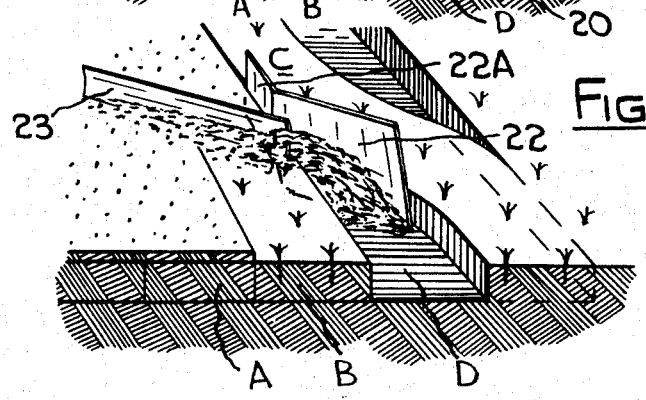
WALTER E. F. WATSON INVENTOR
BY
ATTORNEY

WALTER E. F. WATSON INVENTOR

May 19, 1959

W. E. F. WATSON 2,887,169

SOIL-WORKING PLOUGH

Filed July 9, 1956

WALTER E. F. WATSON INVENTOR

BY

ATTORNEY

2,887,169

SOIL-WORKING PLOUGH

Walter E. F. Watson, Invercargill, New Zealand

Application July 9, 1956, Serial No. 596,716

Claims priority, application New Zealand August 11, 1955

3 Claims. (Cl. 172—166)

This invention has reference to agriculture. Agriculture is based upon working the soil as by ploughing and fertilizing, the latter now being deemed essential according to present practices.

It is known that fertility of the soil is greatest in the top layer and the plough turns this layer in slices or sections right under to leave comparatively empty soil, hence the need for fertilizers.

The basic difference between the use of an ordinary plough and a plough according to the present invention is that in the latter the surface of the top layer, i.e. turf, is not buried but merely pushed to one side without being inverted and covered with a shallow layer of fine soil.

An object of the present invention is to provide an improved plough for use in working the soil whereby a furrow slice is shifted aside without inverting it.

A further object of the invention is to provide an improved plough for use in working the soil whereby bottom soil from a furrow is taken up and spread on a shifted furrow slice.

In fully describing the invention reference will hereinafter be made to the accompanying drawings, in which:

Figure 1 is a diagrammatic perspective view of a part of cultivated land showing a furrow slice partially shifted aside, without being inverted, and other slices prepared;

Figure 2 is a similar view thereto, but a basic component of my plough shown in a working relationship;

Fig. 3 is a similar view thereto, but on a larger scale and showing the components cutting a furrow slice;

Fig. 4 is a similar view thereto, but on a larger scale and showing the components taking up and spreading bottom soil of a furrow on to a shifted aside furrow slice;

Figure 5:
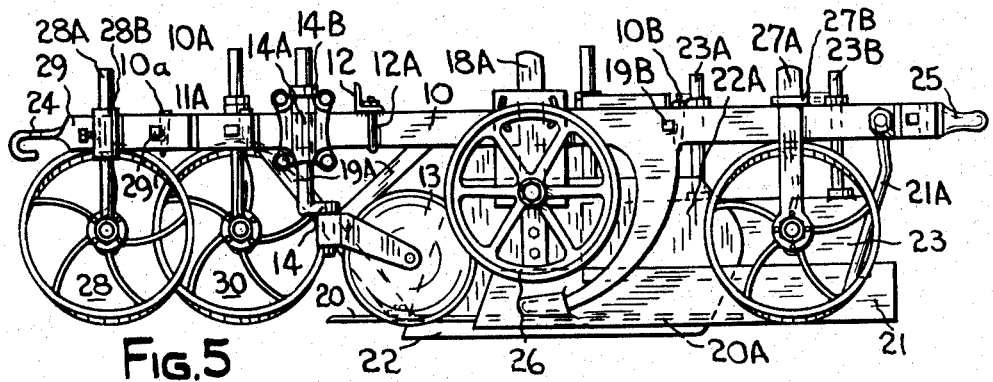
Fig. 5 is a side view, on reduced scale, of the plough.
Figure 6:
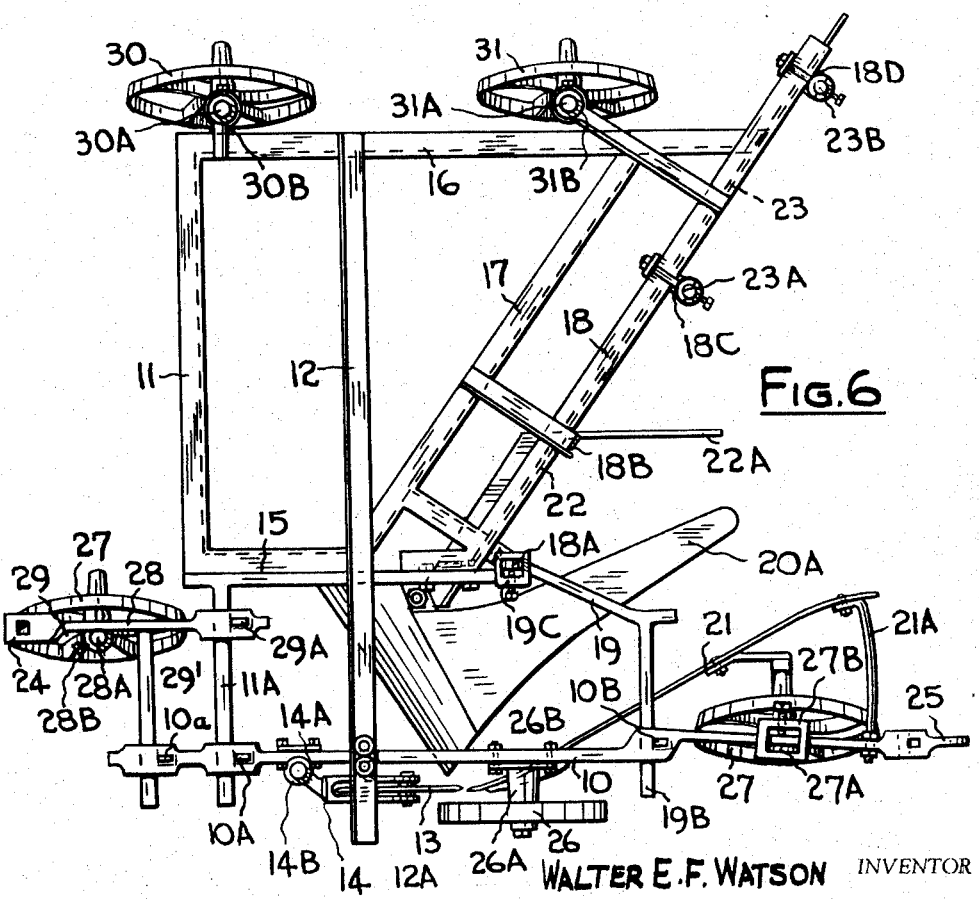
Fig. 6 is a plan thereof.
Figure 7:
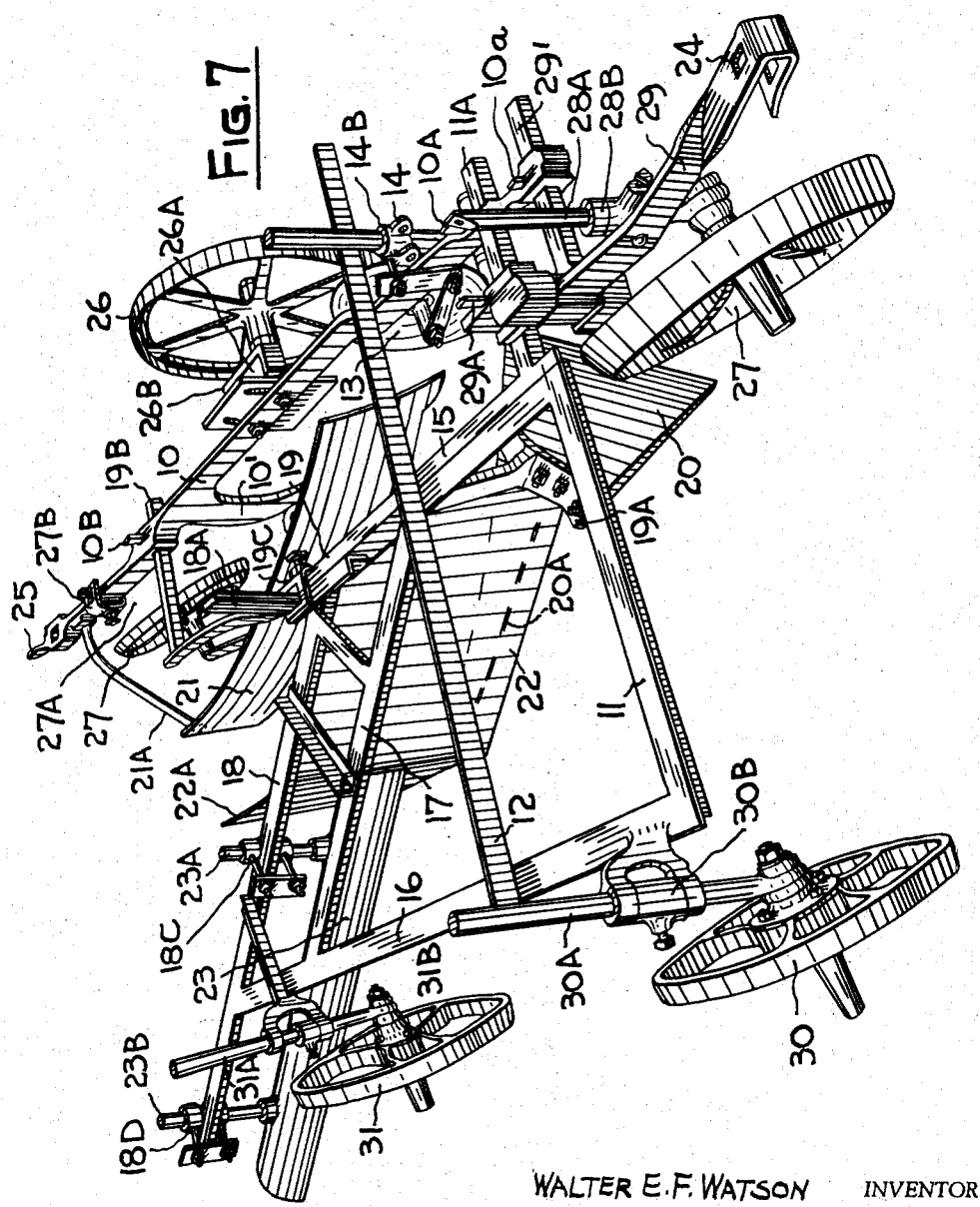
Figure 7 is a front perspective view on larger scale of the plough.
Figure 8:
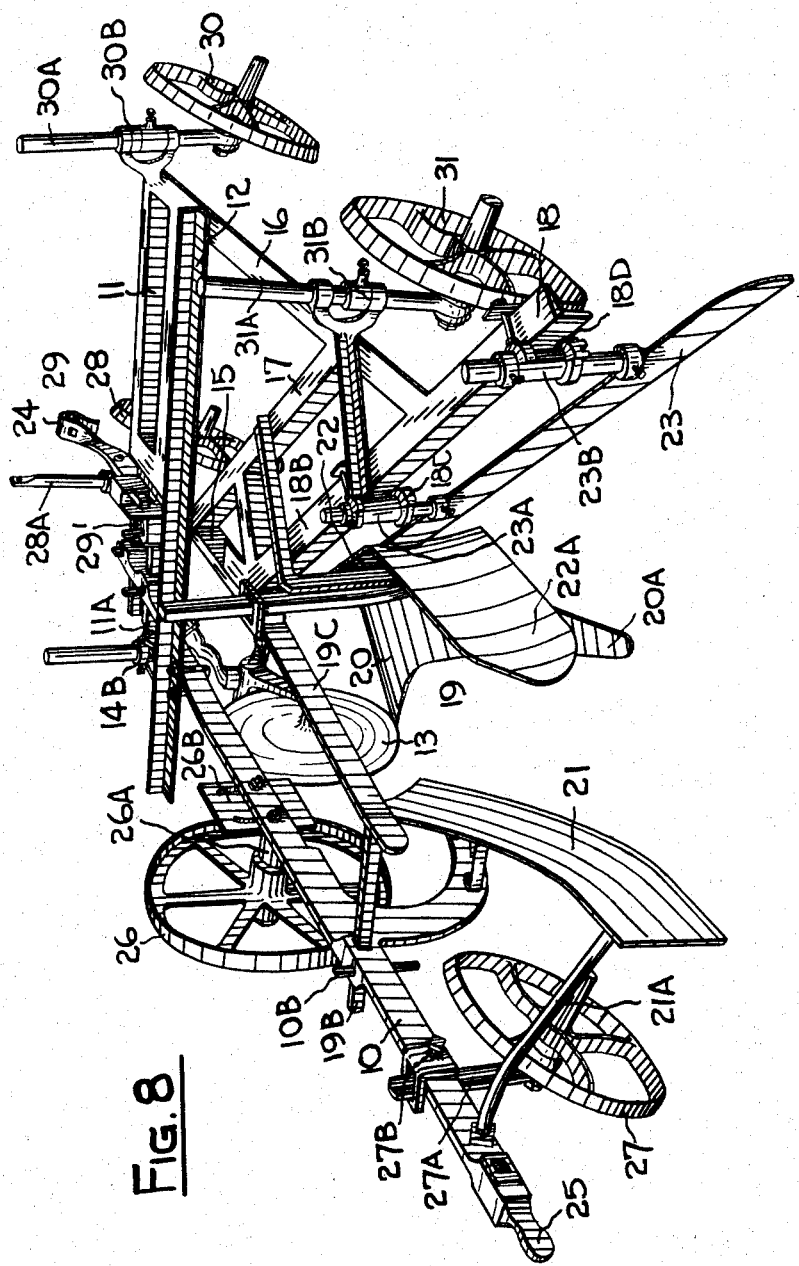
Figure 8 is a rear perspective view thereof.

In giving effect to the plough illustrated by Figures 5 to 8 of the drawings, a frame is made up by a beam or main member 10 and a front cross member 11 with a bar 11A passed through a hole in the main member 10 and attached thereto by a wedge 10A. The frame also includes a further cross member 12 attached by a U-bolt 12A to the main member 10. This member 10 has a disk coulter 13 for effecting a vertical cut later referred to, adjustably mounted towards its front by a vertical post mounting 14, its post passing through a bearing 14A attached on the main member 10 with a collar 14B adjustably fixed on the upper portion of the post whereby the height of the coulter to the main member can be regulated.

The frame also includes a shorter inner member 15 and a longer outer side member 16 spaced a distance apart on the cross members 11 and 12, but in parallel alignment with the main member 10. The rear portion of the frame includes two parallelly spaced members 17, 18, extending back diagonally from the rear end of the inner member 15 to the end of the rear outer side member 16, the back diagonal member 18 projecting out beyond the side member 16.

Attached to the inner member 15 of the frame is a shorter member 19 carrying a share 20, a V-shaped leg 19A depending from this member, the share effecting a horizontal cut later referred to. The rear end of this member 19 extends at a right angle and at its extremity 19B is passed through a hole in the rear end of the main member 10 and attached thereto by a wedge 10B. The attachments of the bar 11A the member 12 and the member's end 19B provide for rigidly positioning the frame laterally of the main member 10 and to also provide for the lateral adjustment of the frame. The share 20 is in the nature of a horizontal blade having a front cutting edge extending obliquely from a leading tip positioned centrally below the members 15 to a rearward tip located near the disk coulter 13 and therefore is a left hand share as shown particularly in drawing Fig. 6. This share 20 has a tail-piece 20A extending back diagonally inward from a front edge of the share to be under the shorter member 19. This tail-piece 20A will enable a furrow slice to be moved laterally without friction against the bed from which it has been cut without turning over.

A mouldboard 21 is provided in the nature of a substantially vertical plate with its front end attached to a leg 10' of the main member 10 to be located just behind the disk coulter 13 and its rear end attached by a brace 21A to the back of such member. This mouldboard 21 extends rearwardly to be generally in line with the tail-piece 20A of the share 20, but substantially at a furrow width. The mouldboard will therefore cross a furrow width and will advance at an angle to the furrow length.

A further component included in the invention is a digger 22 in the nature of a blade slightly curved in its height, i.e. oblique vertically, which blade is mounted at its inner end by attachment to a bar 18A clamped by an angle plate 19C to the member 19 and braced by an outer angle strip 18B to the diagonal member 18 for the blade's bottom edge to be at a level lower than the cutting edge of the share 20. This digger blade is so positioned to extend from behind the share 20 rearward below the diagonal member 18 at an angle of about 155° relative to the member 15. This blade digger 22 is provided with a side board or deflecting end 22A turned straight back to be disposed in line with and for pressing against the inner edge of a previously shifted furrow slice, shortly referred to. This end 22A extends back in line with the main member 10 from the digger 22 to a point where the furrow is completely bedded to prevent loose earth from falling down the steep face of the empty furrow, thus preventing the slice bedding properly.

Another component consists in a spreader 23 that is adjustably mounted by two end posts 23A, 23B passing through clamp brackets 18C, 18D upon the rear diagonal member 18 of the frame so that the spreader is angularly disposed to the front of the implement and extends in line with and beyond the upper part of the digger 22.

For the purpose of operation the implement has a hitch bracket 24 at its front and a guiding handle 25 can be provided at the rear of the main member 10; a land balance wheel 26 mounts such member by having its axle bearing 26A attached to a curved slotted plate 26B clamped to the member for regulating the depth of a furrow, a furrow pressure wheel 27 is mounted by a bar 27A clamped in a bracket 27B to the main member 10 and also a further wheel 28 is mounted by a post 28A located in a bearing 28B attached to a short draw-bar 29 mounted on the side bar 11A with a wedge 29A. This front bar also has a secondary member 29¹ mounted at the front of the main member 10 with a wedge 10a. Adjustment of the bar 29 and its member 29A relative to the member 10 is for regulating the width of a furrow. Two further wheels 30, 31 are similarly mounted as the wheel 28 by posts 30A, 31A passing through bearings 30B, 31B attached at the front and towards the rear of the frame member 16. These wheels 30, 31 are furrow balance wheels.

In the method of operation of the implement, as indicated in Figures 1, 2, 3 and 4 of the drawings, the function is for sub-soil brought up by the digger 22 to be thrown on to previous furrow slices A and B by its angle in relation to line of travel coupled with forward motion of the plough. This sub-soil earth boils up and reduces lumps to granulation. This seed-bed soil is spread evenly over at least two furrow slices by the spreader 23. Since the plough is only a single-furrow type, it will be seen that each furrow slice will be graded twice. The coulter 13 makes its vertical cut and the share 20 makes its horizontal cut and the formed severed slice C is shifted diagonally, i.e. displaced laterally from the undisturbed soil, across to a previously cut furrow D by being directed against the mouldboard 21 and carried on the tailpiece 20A. In opening up a field an equivalent of the furrow slice is removed and thrown up on top to allow the implement to be able to function fully on its next run.

In this method of working the soil a surface completely covered with pulverised soil is secured in one operation to a desired depth, such as up to two inches. The original texture of the sod (slice) remains unchanged, since it was never inverted, hence there is no need for a roller to consolidate it again. The original grass turf rots where it lies, to act like soil mulch, forming a layer of humus. The bottom soil is brought up without seriously disturbing the top, and, finally, it keeps the turf in the layer of aerobic bacteria.

The depth of the digger bottom below the share can be about two inches, but any depth of tilth up to two inches could advantageously be had. The furrow slice can be of any desired width, depending upon circumstances.

The work of all following tillage implements is thus obviated and the soil is ready for immediate sowing; alternatively the procedure can be reversed, the ground sown first and ploughed afterwards. On actual test there is little to chose between either method.

Having now described my invention, what I claim is:

1. A plough comprising a frame having a furrow wheel and a land wheel, a coulter disk mounted in the frame, a blade share mounted in the frame extending horizontally for a furrow width with an outer corner of its forward cutting edge located near the coulter disk and with a tail piece extending horizontally inwardly and rearwardly therefrom, a mouldboard mounted in the frame with its forward edge located behind the coulter disk and the mouldboard extending diagonally for a furrow width rearwardly and inwardly in proximity to the adacent side of the tail piece of the blade share, and a blade digger mounted in the frame to be substantially vertical and extending diagonally rearwardly behind the forward edge of the blade share for a furrow width with its bottom edge located at a level slightly lower than the blade share.

2. A plough as defined by claim 1 wherein an end of the blade digger is turned to extend straight back.

3. A plough as defined by claim 1 wherein a spreader is mounted in the frame to extend rearwardly in line with and beyond the blade digger at a level about its bottom edge.

References Cited in the file of this patent
UNITED STATES PATENTS

| | | |
|---|---|---|
| 209,175 | Lane | Oct. 22, 1878 |
| 689,194 | Katterheinrich | Dec. 17, 1901 |
| 1,235,392 | Spangelo | July 31, 1917 |
| 1,721,462 | Metz | July 16, 1929 |
| 2,418,954 | Raleigh | Apr. 15, 1947 |